April 22, 1969    A. A. BELLINGER ET AL    3,439,432
METHOD AND MEANS FOR PURGING PULVERULENT
MATERIALS OF OCCLUDED GASES
Filed Nov. 2, 1967
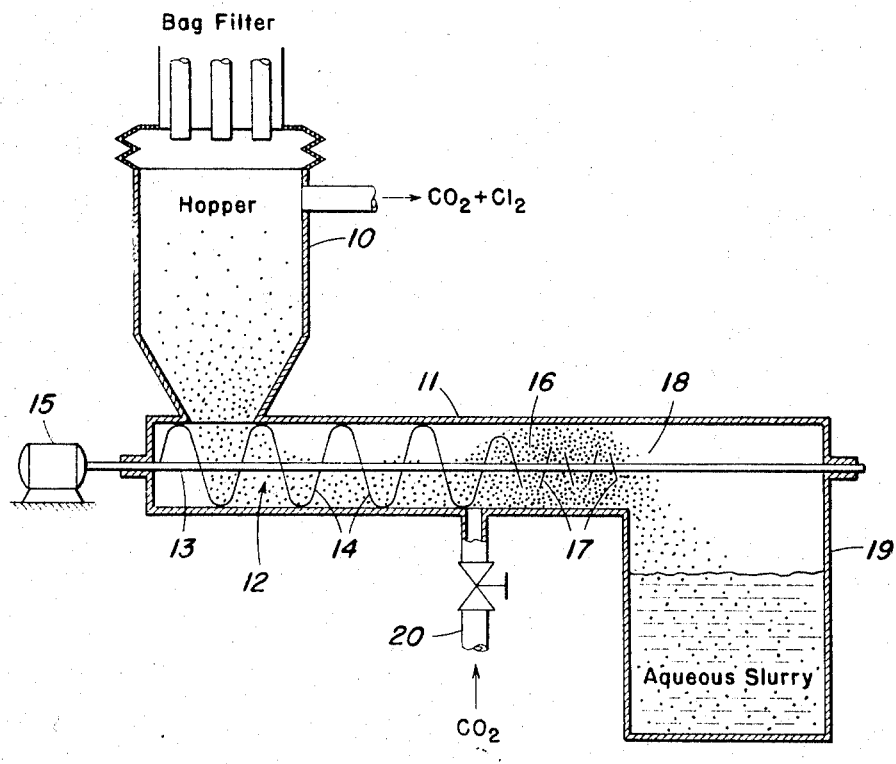
INVENTORS
Arthur A. Bellinger
George W. Doyle
BY
Harold L. Gammons
AGENT 大
United States Patent Office 3,439,432
Patented Apr. 22, 1969

3,439,432
METHOD AND MEANS FOR PURGING PULVERU-LENT MATERIALS OF OCCLUDED GASES
Arthur A. Bellinger, Willingboro, and George W. Doyle, Middletown, N.J., assignors to National Lead Company, New York, N.Y., a corporation of New Jersey
Filed Nov. 2, 1967, Ser. No. 680,242
Int. Cl. F26b *17/18*
U.S. Cl. 34—36                                                6 Claims

ABSTRACT OF THE DISCLOSURE

The invention relates in general to improved method and means for purging vapor phase titanium dioxide pigment of occluded gases wherein the screw conveyor tube used to transport the pigment from the filter-hopper to the slurry tank of a sealed pigment-collecting system is provided with a plug-seal in combination with a stream of inert purging gas flowing countercurrent to the movement of titanium dioxide through said conveyor tube.

Background of the invention

In general vapor phase titanium dioxide pigment is produced by reacting vaporous titanium tetrachloride with oxygen at elevated temperatures to produce reaction product gases containing finely divided titanium dioxide, free chlorine, $CO_2$ and oxygen. The finely divided titanium dioxide is then recovered by cooling the reaction product gases to a temperature below about 400° C. and sending the cooled gases through suitable bag filters in which the titanium dioxide is separated from the gases and discharged into suitable collecting means such as a slurry tank via conveyor means.

It is characteristic of the vapor phase process that appreciable quantities of halide gas, i.e., chlorine are occluded within the interstices of the titanium dioxide mass and/or on the surfaces of the individual particles and hence are carried into the slurry tank. Here the gaseous chlorine reacts to form hypochlorites. In the past it was not unusual to have as high as 300 p.p.m. hypochlorites (as HClO) in these slurries. These hypochlorites are highly corrosive and when present in any appreciable quantity are potentially dangerous since raw chlorine gas may be evolved in subsequent titanium dioxide processing steps. It has been the practice therefore to introduce suitable antichlor reagents to the $TiO_2$-$H_2O$ slurry to destroy the oxychlorides. However the amount of antichlor reagent required is relatively large and hence costly both from the standpoint of material and labor. Also the addition of the anti-chlor reagent increases the soluble salt content of the slurry thereby adversely affecting the fluidity of the slurry and the dispersibility of the titanium dioxide.

A search of the pertinent art has uncovered no patent relating to this particular problem. However, U.S. 3,249,-424, Phillips et al., May 3, 1966 discloses a method and means for preventing a gas from passing in either direction through a screw conveyor by operating the conveyor screw so as to keep the conveyor tube full of material at all times; and by maintaining a pressure balance between the gases at the entrance and exit ends, respectively, of the conveyor tube.

However the Phillips patent does not suffice to effect the purposes of the present invention. In the first place the flow of titanium dioxide to the hopper from one or more vapor phase reactors is not always uniform and hence the screw conveyor will not always be full. Further, the gaseous chlorine is occluded, for the most part, in the voids between the pigment particles as well as on the surfaces thereof and hence will be carried into the slurry tank irrespective of balanced gas pressure at opposite ends of the screw conveyor.

Summary of the invention

The present invention relates to a novel method and means for purging pulverulent materials of occluded gases and in particular purging a vapor phase $TiO_2$ pigment of chlorine gas during transit from the filter bag hopper to the slurry tank via the screw conveyor of a sealed pigment-collecting system so as to prevent the formation of oxychlorides in the slurry and hence eliminate the problems attendant thereto. Briefly the chlorine gas is excluded from entering the slurry tank by utilizing, in combination, a plug-seal and a gas purge. Both the plug-seal and the gas purge are provided in the screw conveyor tube. The plug-seal comprises a relatively compact mass of the titanium dioxide which is being moved through the conveyor tube by the conveyor screw; and is formed by altering a selected flight or flights of the conveyor screw such that the titanium dioxide is caused to collect and fill up the entire cross section of the conveyor tube opposite the altered section of the screw thereby forming a plug which effectively seals off this portion of the tube against the escape of gas therefrom as and for the purpose hereinafter described. Alterations in the screw flights are preferably done at a point in the conveyor tube just preceding discharge of the titanium dioxide from the conveyor tube into the slurry tank.

As mentioned above the plug-seal of the screw conveyor is adapted to be used in conjunction with gas purging-means and this comprises one or more purge-gas feed pipes connected into the wall of the conveyor tube at a point or points therein at or ahead of the plug-seal. For the purposes of this invention the purge-gas is one that is inert to the solid and gaseous components in the conveyor, a preferred purge-gas being $CO_2$. However other inert gases such as air, nitrogen, argon and the like may be used. The purge-gas is pressure-fed to the conveyor tube so as to flow in a direction countercurrent to the flow of pulverulent material therethrough and with sufficient force and volume to purge the titanium dioxide of any chlorine gas. The pressure and flow rates of the purge gas will vary, of course, depending upon such factors as the size of the conveyor tube, the nature of the pulverulent material, and the rate at which it is being transported through the conveyor tube.

While the above summary of the invention has been directed to a specific application of the invention, i.e., the purging of vapor phase titanium dioxide of chlorine gas it will be understood that the invention is not limited to this specific use but is applicable to other industrial processes wherein it is desirable to purge pulverulent materials of occluded gases.

Description of the drawings

FIG. 1 is a schematic elevational view showing application of the invention to a screw conveyor for feeding vapor phase titanium dioxide from the filter hopper to the slurry tank of a sealed pigment-collecting system.

Preferred embodiment of the invention

The preferred embodiment of the invention is shown in the drawing wherein a pulverulent material, in this case vapor phase titanium dioxide is being fed from the hopper 10 of a bag filter into the entrance end of a screw conveyor tube 11 and from thence into a slurry tank hereinafter described. Since gaseous chlorine or chlorine compounds are an ever present industrial hazard at this stage in the production of the pigment the pigment-collecting system comprising the bag filter, hopper, screw conveyor tube and aqueous slurry tank, is completely sealed to preclude the escape of these noxious gases into the atmosphere.

Rotatably mounted in the tube 11 is a conveyor screw 12 comprising a shaft 13 having a plurality of helical flights 14 therealong said shaft being suitably supported at its opposite ends in the conveyor tube 11 with its outboard end connected to a power supply such as indicated by motor 15.

The inboard end of the conveyor screw is altered as mentioned above to form a plug-seal 16 in the tube adjacent its discharge end. In the preferred embodiment of the invention the conveyor screw is altered by cutting away portions of several flights of the screw 12 in the manner shown in the drawing to form a plurality of blade-like elements 17 projecting radially from the shaft the purpose of which is two-fold namely to allow the pulverulent material to build up within the conveyor tube and form the plug-seal 16; and to impart some degree of agitation to the material of the plug-seal so as to keep it relatively loose and hence free to pass from the discharge end 18 of the conveyor tube into the slurry tank indicated at 19. Since the plug-seal 16 is formed adjacent the discharge end 18 of the conveyor tubes it serves both to prevent the purging gas from backing-up into the slurry tank and thus being wasted; and also to prevent water vapor and/or steam from the slurry tank from passing through the conveyor tube to the bag filter.

The purge gas, in this instance $CO_2$, is fed into the conveyor tube via feed pipe 20 at a point immediately forward of its plug-seal 16. The pressure and flow rate are not critical and may be varied to meet the particular operating conditions at any given time the only criteria being that the pressure and flow rate be sufficient, in conjunction with the plug-seal, to purge the $TiO_2$ pigment in the conveyor tube of chlorine gas but not so high as to blow out the plug-seal. The purge-gas together with the gaseous chlorine pass to the forward end of the conveyor tube countercurrent to the movement of pigment therethrough and from thence up into the hopper from which they are led off to suitable collecting means my means of an exhaust pipe as shown in the accompanying drawing.

With the use of the apparatus hereinabove described chlorine gas has been so effectively purged from a vapor phase titanium dioxide being discharged into a slurry tank that periodic tests for the presence of hypochlorites in parts per million in the $TiO_2$-$H_2O$ slurry consistantly showed values ranging from none to no more than about 10 p.p.m. These results are especially significant when it is understood that no more than 35 p.p.m. hypochlorites are permissable in the $TiO_2$-$H_2O$ slurry because of increased corrosivity above this level; and that prior to this invention it was not unusual to have as high as 200 p.p.m. hypochlorites in the aqueous pigment slurry.

While the foregoing description of the invention has been confined to the use of a single screw conveyor it will be understood that the invention contemplates using two or more screw conveyors to service a single hopper; and to discharge the $TiO_2$ pigment into a single slurry tank.

The following example will serve to further illustrate the invention.

A multitube burner of the type used to produce a vapor phase $TiO_2$ by the reaction of vaporous $TiCl_4$ with oxygen were operated at a rate to produce, in toto, approximately twenty tons of $TiO_2$ per day. The $TiO_2$ burdened reaction product gases from the burner were cooled and fed into a bag filter unit. The $TiO_2$ recovered from the bag filter was discharged into a hopper and from thence into the entrance end of a screw conveyor tube approximately 4 ft. long and 1 ft. in diameter. Mounted in the conveyor tube was a conveyor screw having helical flights designed to transport $TiO_2$ from the hopper to the discharge end of the conveyor tube from whence the $TiO_2$ was discharged into a slurry tank where the solids content of the slurry was being maintained at approximately 30%, the conveyor screw was driven at a constant speed of 30 r.p.m. The inboard end of the conveyor screw was altered in the manner hereinabove described to provide a plurality of radial blades adjacent its inner end so as to form a $TiO_2$ plug-seal adjacent the discharge end of the tube. Prior to purging the pigmentary $TiO_2$ in the screw conveyor the hypochlorite level in the slurry expressed as hypochlorous acid, was 115 p.p.m. Carbon dioxide gas was then fed into the conveyor tube immediately forward of its plug seal at the rate of about 10 standard cu. ft./min. through a single nozzle. The operation was continued for several days during which time the aqueous $TiO_2$ slurry was periodically tested for hypochlorites. When the initial slurry had been purged from the pulp tank the hypochlorite decreased to <1 p.p.m. (expressed as CHlO) and remained at that level.

While this invention has been described and illustrated by the examples shown, it is not intended to be strictly limited thereto, and other variations and modifications may be employed within the scope of the following claims.

We claim:
1. In a sealed system for collecting pulverulent material wherein the pulveulent material is transported through a conveyor tube in an atomsphere of noxious gases to suitable collecting means the improvement comprising: means adapted to purge said pulverulent material of said noxious gases, said purging means comprising, in combination, a plug-seal at the discharge end of said conveyor tube and a stream of inert purge-gas arranged to enter said conveyor tube adjacent said plug-seal and to flow through said tube in a direction countercurrent to said pulverulent material.

2. In a sealed system for collecting pulverulent material according to claim 1 wherein said plug-seal comprises said pulverulent material and said inert purge-gas is selected from the group consisting of air, nitrogen, argon, carbon dioxide and mixtures thereof.

3. In apparatus for collecting vapor phase titanium dioxide from product gases produced by the reaction of gaseous titanium tetrachloride with oxygen, said product gases containing gaseous chlorine wherein the titanium dioxide burdened product gases are passed through filtering means, and the titanium dioxide, including occluded chlorine is discharged therefrom into the hopper of a sealed collecting system which includes screw conveyor means for transporting said titanium dioxide from said filter to a slurry tank; the improvement comprising: purging means in said screw conveyor means for purging said titanium dioxide of occluded gaseous chlorine before said titanium dioxide is discharged into said slurry tank said purging means comprising in combination a plug-seal of said titanium dioxide in said screw conveyor means adjacent the discharge end thereof and a stream of inert purge-gas introduced into said screw conveyor means adjacent said plug-seal and directed toward the entrance end of said screw conveyor means countercurrent to the movement of said titanium dioxide therethrough.

4. In apparatus for collecting vapor phase $TiO_2$ from reaction product gases according to claim 3 wherein said plug-seal is compacted titanium dioxide and said purge gas is $CO_2$.

5. In a process for collecting pulverulent material wherein the pulverulent material is transported through sealed conveyor means in an atmosphere of noxious gases to suitable collecting means the improvement comprising: purging said pulverulent material of any occluded noxious gases by maintaining a gas seal in said conveyor means at the end thereof adjacent said collecting means, flowing an inert purge-gas through said conveyor means from said gas-seal in a direction countercurrent to the flow of pulverulent material therethrough and exhausting from said sealed conveyor means the purge-gas together with any noxious gases removed from said pulverulent material.

6. In a process for recovering pulverulent material from gases according to claim 5 wherein the pulverulent material is vapor phase titanium dioxide and the noxious gas is chorine.

References Cited

UNITED STATES PATENTS

| | | | |
|---|---|---|---|
| 3,130,008 | 4/1964 | Stokes et al. | 23—202 XR |
| 3,217,787 | 11/1965 | Preston | 23—202 XR |
| 3,279,087 | 10/1966 | Hearne et al. | 34—36 XR |

KENNETH W. SPRAGUE, *Primary Examiner.*

U.S. Cl. X.R.

34—182